United States Patent
Rohrbach

[11] 3,771,379
[45] Nov. 13, 1973

[54] SAFETY STEERING ARRANGEMENTS FOR MOTOR VEHICLES

[75] Inventor: Wolfgang Rohrbach, Russelsheim, Germany

[73] Assignee: General Motors Corporation, Detroit, Mich.

[22] Filed: Oct. 4, 1972

[21] Appl. No.: 294,824

[30] Foreign Application Priority Data
Oct. 7, 1971   Germany.............P 21 50 061.8

[52] U.S. Cl. .................................. 74/492, 74/552
[51] Int. Cl. ............................................. B62d 1/18
[58] Field of Search .................... 74/492, 493, 552; 188/1 C

[56] References Cited
UNITED STATES PATENTS
3,434,367   3/1969   Renneker et al. ..................... 74/492
3,482,466   12/1969   Orlich et al. ............................ 74/492

Primary Examiner—Milton Kaufman
Attorney—D. L. Ellis et al.

[57] ABSTRACT

A safety steering arrangement for a motor vehicle includes a plastically distortable deformation member interposed axially between the spokes and a hub member of a steering wheel and/or arranged as an energy-absorbent jacket tube coaxially surrounding a longitudinally collapsible steering shaft portion of a steering column. The deformation member consists of a helically wound strip of steel sheet material the windings of which are interconnected by several circumferentially spaced and longitudinally extending stays, which are likewise made of steel sheet material and are connected to the windings of the helically wound strip by spot welds.

Each of the stays is formed with convex corrugations disposed between the individual windings of the helically wound strip, for accommodating tilting movement of the steering wheel in the event of impact of the driver against the steering wheel.

8 Claims, 4 Drawing Figures

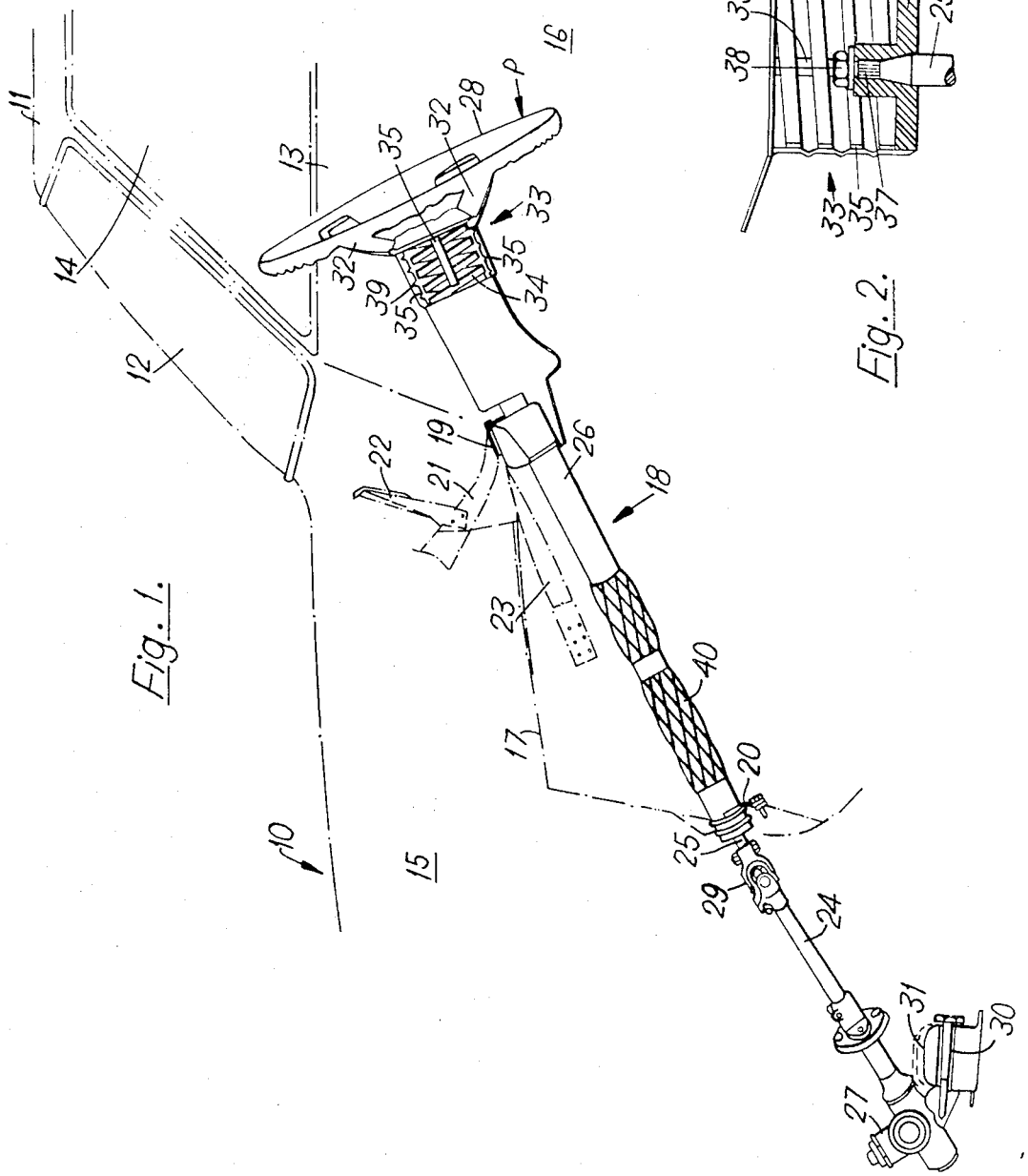

SAFETY STEERING ARRANGEMENTS FOR MOTOR VEHICLES

This invention relates to safety steering arrangements for motor vehicles, for ameliorating the effects on the driver of impact against the steering wheel of the vehicle.

According to the invention, in a safety steering arrangement for a motor vehicle, a deformation member arranged concentrically of the steering column, for conversion into work of deformation of at least a part of the kinetic energy acting on the steering wheel in the event of impact of the driver thereagainst, comprises a helically wound strip of sheet material with the windings interconnected by several circumferentially spaced and longitudinally extending stays.

Such a deformation member is simple in construction, and is potentially cheap to manufacture. The use of a single helically wound strip of sheet material offers the advantage of simplicity, and under deformation conditions tends to allow at least some of the windings to telescope over one another to a certain extent, so permitting an increased amount of deformation, with correspondingly increased absorption of the energy of driver impact.

Further, the interconnection of the windings by the longitudinally extending stays allows the deformation member to be made with a good degree of torsional rigidity, which is desirable when the deformation member is to be connected, as a so-called "deformation pot," axially interposed between the spokes of the steering wheel (possibly by way of a hub portion secured to the inner ends of the spokes) and a steering wheel hub member that is adapted to be connected to a rotary steering shaft of the steering column, since in such a location the deformation member is utilised to transmit the steering effort applied to the steering wheel.

The helically wound strip of the deformation member is conveniently made of steel sheet material (that is, sheet steel). The longitudinally extending stays of the deformation member may likewise be made of steel sheet material, and they may be connected to the windings of the helically wound strip by spot welds. A convenient arrangement is one in which there are four of the longitudinally extending stays, uniformly circumferentially spaced around the periphery of the helically wound strip.

A deformation member in conformity with the invention can alternatively, or additionally, be used as an energy-absorbent jacket tube portion for the steering shaft, in a location coaxially surrounding a longitudinally collapsible steering shaft portion of the steering column. In this case all parameters (primarily pitch, thickness, length and diameter) should be such as to provide the required energy-absorption values. When deformation members are used at both of the locations, it is often desirable to proportion the energy-absorption characteristics such that relatively little of the energy is dissipated at the steering wheel, and that correspondingly the greater part of the energy is dissipated in the jacket tube region.

If desired, the energy-absorbing action may be supplemented by the use of a supplementary deformation element in the form of a lattice tube arranged as an energy-absorbent jacket tube portion coaxially surrounding the longitudinally collapsible steering shaft portion of the steering column.

An important feature of the safety steering arrangement according to the invention is that it potentially has a good buckling capability. In most cases the impact of the driver takes place initially against the lower half of the steering wheel, and the good buckling capability of the deformation member in conformity with the invention (due to a large extent to the action of the longitudinally extending stays) makes it possible to arrange that in an extremely short time after impact the driver's body makes contact with the full area of the steering wheel, so reducing the impact loading per unit area of contact, in an arrangement in whch the deformation member forms the so-called "deformation pot." During such buckling some energy is dissipated, so providing some initial checking of the relative forward movement of the driver's body, as the steering wheel moves with a downward component into the position providing full-area contact for the driver's body against the steering wheel. Such buckling ability of the deformation member can be enhanced by forming each of the longitudinally extending stays of the deformation member with convex corrugations disposed between the individual windings of the helically wound strip, whereby during buckling the individual longitudinally extending stays can readily accommodate differing amounts of movement of the windings in the direction longitudinally of the steering column.

The appended claims define the scope of the invention claimed. The invention and how it can be performed are hereinafter particularly described with reference to the accompanying drawings, in which:

FIG. 1 is a somewhat schematic fragmentary view of the front portion of a motor car, with one embodiment of a safety steering arrangement in accordance with the invention shown in side elevation;

FIG. 2 is an enlarged fragmentary longitudinal section showing details of a deformation member arranged between the spokes and a hub member of a steering wheel in the safety steering arrangement shown in FIG. 1;

Figure 3:
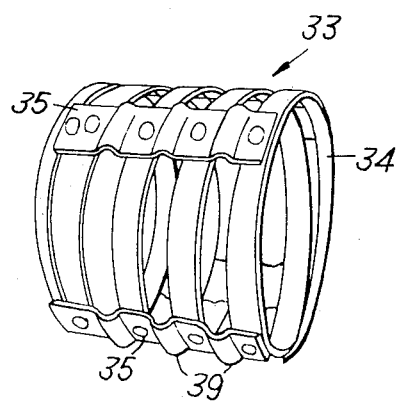
FIG. 3 is a perspective view of the deformation member shown in FIG. 2.

In FIG. 1 are represented by dot-dash lines a portion of the bonnet 10, roof 11, windscreen 12 and front door 13 with side window 14 of a motor car body, together with a fire wall 17 separating an engine compartment 15 from a passenger compartment 16. Also to be seen in FIG. 1 is a safety steering arrangement of the car, designated as a whole by 18, which is secured to the fire wall 17 by two mountings 19 and 20. Fastening elements 21, 22 and 23 at the upper mounting 19 are arranged to absorb the main forces occurring during normal operation. At the lower mounting 20 the safety steering arrangement passes through the fire wall 17.

The steering system essentially comprises a steering shaft 24, 25 whose upper region is coaxially surrounded by a jacket tube 26, together with a steering gear 27 and a steering wheel 28. The steering shaft is composed of an upper part 25 which is longitudinally collapsible in a telescopic manner and is connected to a lower part 24 by a universal joint 29 below the lower mounting 20. The universal joint allows free relative angular movement of the two steering shaft parts 24 and 25, and thus serves to increase the safety of the driver. The steering gear 27 is secured to the front axle 31 of the car by means of a bolt 30.

As can be seen particularly in FIG. 2, spokes 32 of the steering wheel 28 pass into a deformation member 33, which consists of a helically wound strip 34 of flat sheet steel and four longitudinally extending stays 35 uniformly circumferentially spaced around the periphery of the flat strip 34 (see also FIG. 3). The longitudinally extending stays 35 are also made of sheet steel, and are spot-welded to the windings of the steel strip 34. The longitudinally extending stays 35 serve to transmit the steering moment to the steering shaft, for which purpose the deformation member passes at its lower end into a steering-wheel hub member 36 (FIG. 2) in which the upper end of the steering shaft part 25 is fixed by means of a splined connection 37 and a locking nut 38. The deformation member 33 is therefore interposed longitudinally between the steering-wheel spokes 32 and the steering-wheel hub member 36.

If, under conditions of vehicle impact, the body of the driver comes into contact with the lower portion of the rim of the steering wheel 28, as illustrated by arrow P, the deformation member 22 undergoes rapid buckling, so allowing the steering wheel to take up a position corresponding to the inclination of the upper part of the driver's body, while at the same time absorbing some of the impact energy. As can be seen in FIGS. 2 and 3, the longitudinally extending stays 35 have convex corrugations 39 in the region between the individual windings of the strip 34, thereby facilitating shortening and lengthening of the longitudinally extending stays 35, as occurs when the steering wheel 28 is tilted.

The flat strip 34 has a cross-section of 10 mm × 2 mm. The relatively small thickness of the strip 34 of only 2 mm permits a useful amount of telescoping of the windings over one another in the lower region, so giving an increased amount of deformation and increased longitudinal travel, in a manner which is favourable with respect to absorption of the energy of impact of the driver.

As soon as the rim of the steering wheel reaches a position of full-area contact with the chest region of the driver, as the driver is thrown against the steering wheel, the greater part of the remaining energy of impact is thereupon absorbed by another deformation member arranged in the jacket tube region of the steering column. In the embodiment shown in FIG. 1, this comprises a known type of lattice tube 40, which forms the energy-absorbing part of the jacket tube 26.

Figure 4:
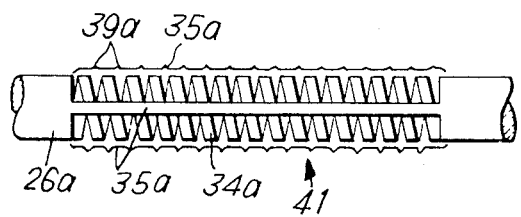
FIG. 4 is a rather schematic fragmentary view showing, in elevation, another embodiment of a safety steering arrangement in accordance with the invention, arranged as a jacket tube portion coaxially surrounding a longitudinally collapsible steering shaft portion of a motor vehicle steering column.

In the embodiment which is shown in FIG. 4, on the other hand, the jacket tube, here designated by 26a, surrounds not a lattice tube as the energy-absorbing part, but a deformation member 41 whose design is essentially the same as the deformation member 33 already described. In FIG. 4, the parts of the deformation member which correspond to parts of the deformation member 33 in FIGS. 1 to 3 are designated by like reference numerals but with an *a* added. The remaining parts of the safety steering arrangement shown in FIG. 4 correspond to those in FIG. 1, and are not shown again in FIG. 4. As in the case of the deformation member 33, for the deformation member 41 the various parameters (pitch, thickness, length, diameter) of the flat strip 34a are calculated to be so inter-related as to provide the required energy-absorption values.

I claim:

1. In a safety steering arrangement for a motor vehicle, having a deformation member arranged concentrically of the steering column, for conversion into work of deformation of at least a part of the kinetic energy acting on the steering wheel in the event of impact of the driver thereagainst, the improvement which comprises utilising as the deformation member a helically wound strip of sheet material with the windings interconnected by a plurality of circumferentially spaced and longitudinally extending stays.

2. In a safety steering arrangement for a motor vehicle, having a deformation member arranged concentrically of the steering column, for conversion into work of deformation of at least a part of the kinetic energy acting on the steering wheel in the event of impact of the driver thereagainst, the improvement which comprises utilising as the deformation member a helically would strip of steel sheet material with the windings interconnected by a plurality of circumferentially spaced and longitudinally extending stays likewise made of steel sheet material, and connected to the windings of the helically wound strip by spot welds.

3. An arrangement according to claim 2, in which each of the longitudinally extending stays of the deformation member is formed with convex corrugations disposed between the individual windings of the helically wound strip.

4. A safety steering arrangement for a motor vehicle, comprising :
    a steering wheel having a plurality of spokes;
    a steering wheel hub member adapted to be connected to a rotary steering shaft of a steering column;
    a deformation member arranged concentrically of the steering column and comprising a helically wound strip of sheet material with the windings interconnected by a plurality of circumferentially spaced and longitudinally extending stays, each of the longitudinally extending stays having convex corrugations thereof disposed between the individual windings of the helically wound strip; and
    means connecting axially opposite ends of the deformation member to the steering wheel spokes and to the steering wheel hub member respectively.

5. A safety steering arrangement for a motor vehicle, comprising:
    a steering wheel having a plurality of spokes;
    a steering wheel hub member adapted to be connected to a rotary steering shaft of a steering column;
    a deformation member arranged concentrically of the steering column and comprising a helically wound strip of steel sheet material with the windings interconnected by four longitudinally extending stays uniformly circumferentially spaced around the periphery of the helically wound strip, the longitudinally extending stays likewise being of steel sheet material, and having spot welds forming connections to the windings of the helically wound strip, each of the longitudinally extending stays having convex corrugations thereof disposed between the individual windings of the helically wound strip; and means connecting axially opposite ends of the deformation member to the steering wheel spokes and to the steering wheel hub member respectively.

6. A safety steering arrangement for a motor vehicle, comprising:
   a steering wheel having a plurality of spokes;
   a steering wheel hub member;
   a rotary steering shaft forming part of a steering column connected to the steering wheel;
   means for permitting longitudinal collapse of a portion of the steering shaft;
   a deformation member arranged concentrically of the steering column and comprising a helically wound strip of steel sheet material with the windings interconnected by a plurality of uniformly circumferentially spaced and longitudinally extending stays, the longitudinally extending stays likewise being of steel sheet material, and having spot welds forming connections to the windings of the helically wound strip, each of the longitudinally extending stays having convex corrugations thereof disposed between the individual windings of the helically wound strip;
   means connecting axially opposite ends of the deformation member to the steering wheel spokes and to the steering wheel hub member respectively;
   a supplementary deformation element in the form of a lattice tube arranged as an energy-absorbent jacket tube coaxially surrounding the longitudinally collapsible portion of the steering shaft; and
   means for transmitting longitudinal thrust forces from relatively longitudinally collapsible portions of the steering shaft to respective axial end portions of the supplementary deformation element.

7. A safety steering arrangement for a motor vehicle, comprising :
   a steering wheel having a plurality of spokes;
   a steering wheel hub member;
   a rotary steering shaft forming part of a steering column connected to the steering wheel;
   means for permitting longitudinal collapse of a portion of the steering shaft;
   a deformation member arranged concentrically of the steering column and comprising a helically wound strip of steel sheet material with the windings interconnected by a plurality of circumferentially spaced and longitudinally extending stays uniformly circumferentially spaced around the periphery of the helically wound strip, the longitudinally extending stays likewise being of steel sheet material, and having spot welds forming connections to the windings of the helically wound strip;
   means connecting axially opposite ends of the deformation member to the steering wheel spokes and to the steering wheel hub member respectively;
   a further deformation member coaxially surrounding the longitudinally collapsible portion of the steering shaft; and
   means for transmitting longitudinal thrust forces from relatively longitudinally collapsible portions of the steering shaft to respective axial end portions of the further deformation member, such that the further deformation member forms an energy-absorbent jacket tube for said longitudinally collapsible steering shaft portion.

8. A safety steering arrangement for a motor vehicle, comprising :
   a steering wheel;
   a rotary steering shaft connected to the steering wheel for the transmission of steering effort therefrom to dirigible wheel means of the vehicle, the steering shaft and steering wheel together forming part of a steering column of the vehicle;
   means for permitting longitudinal collapse of a portion of the steering shaft;
   a deformation member coaxially surrounding the longitudinally collapsible portion of the steering shaft and comprising a helically wound strip of steel sheet material with the windings interconnected by a plurality of longitudinally extending stays uniformly circumferentially spaced around the periphery of the helically wound strip, the longitudinally extending stays likewise being of steel sheet material, and having spot welds forming connections to the windings of the helically wound strip; and
   means for transmitting longitudinal thrust forces from relatively longitudinally collapsible portions of the steering shaft to respective axial end portions of the deformation member, such that the deformation member forms an energy-absorbent jacket tube for said longitudinally collapsible steering shaft portions.

* * * * *